United States Patent Office 3,471,936
Patented Oct. 14, 1969

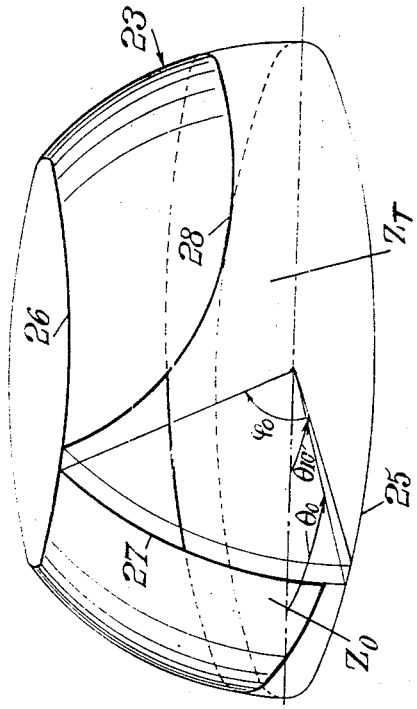
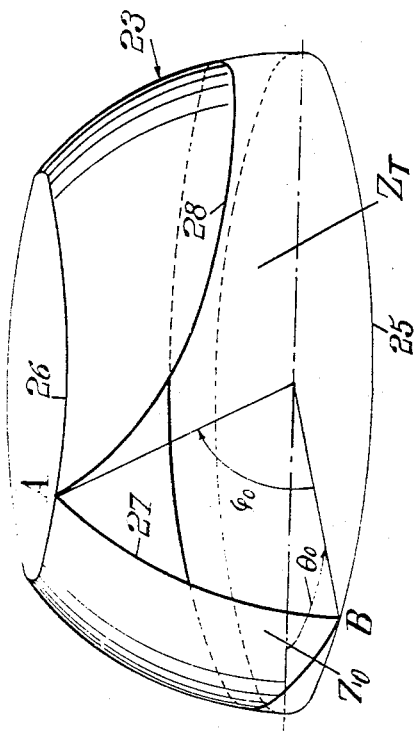

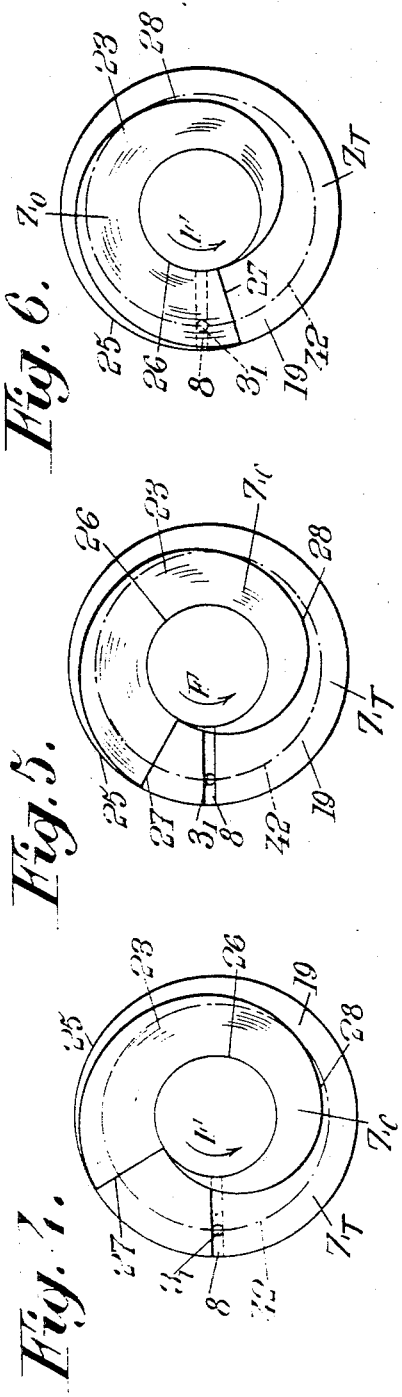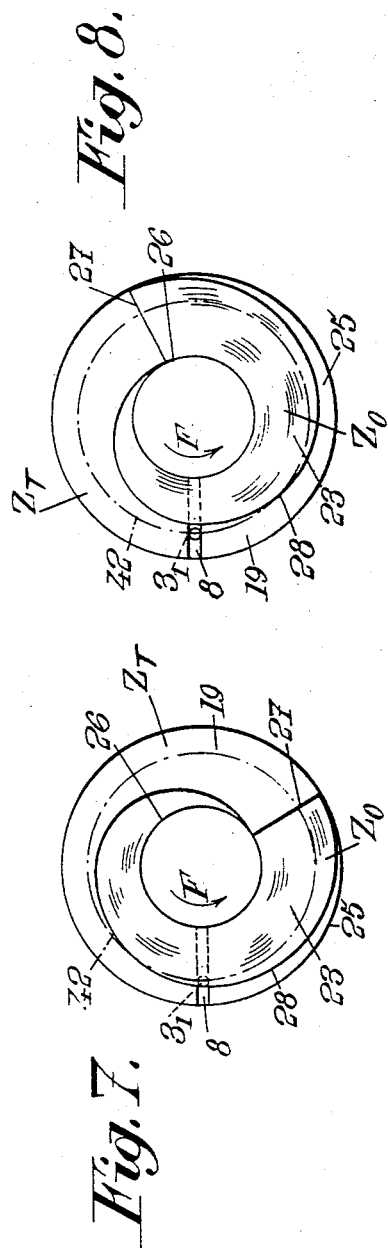

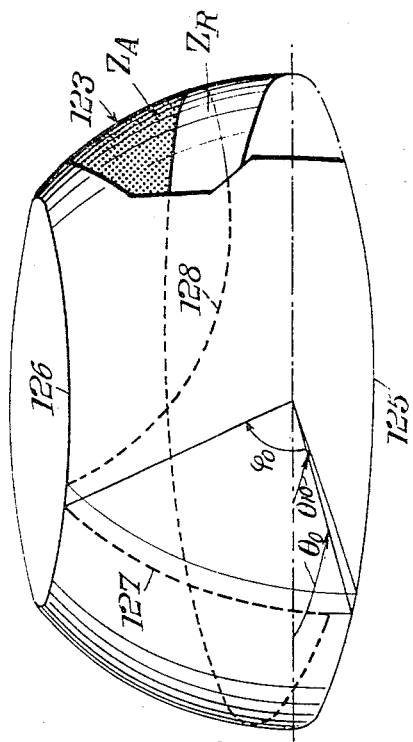
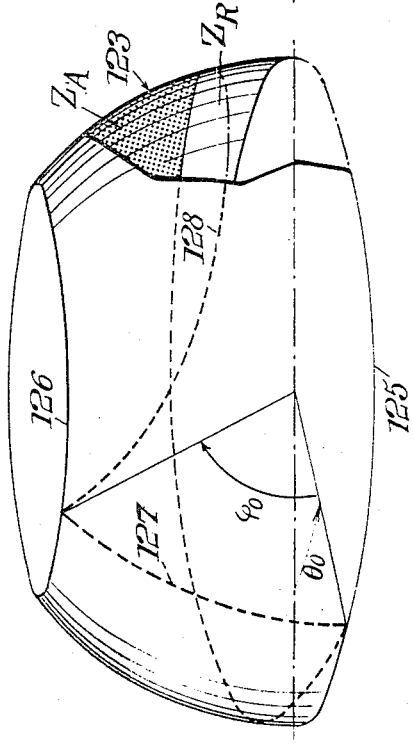

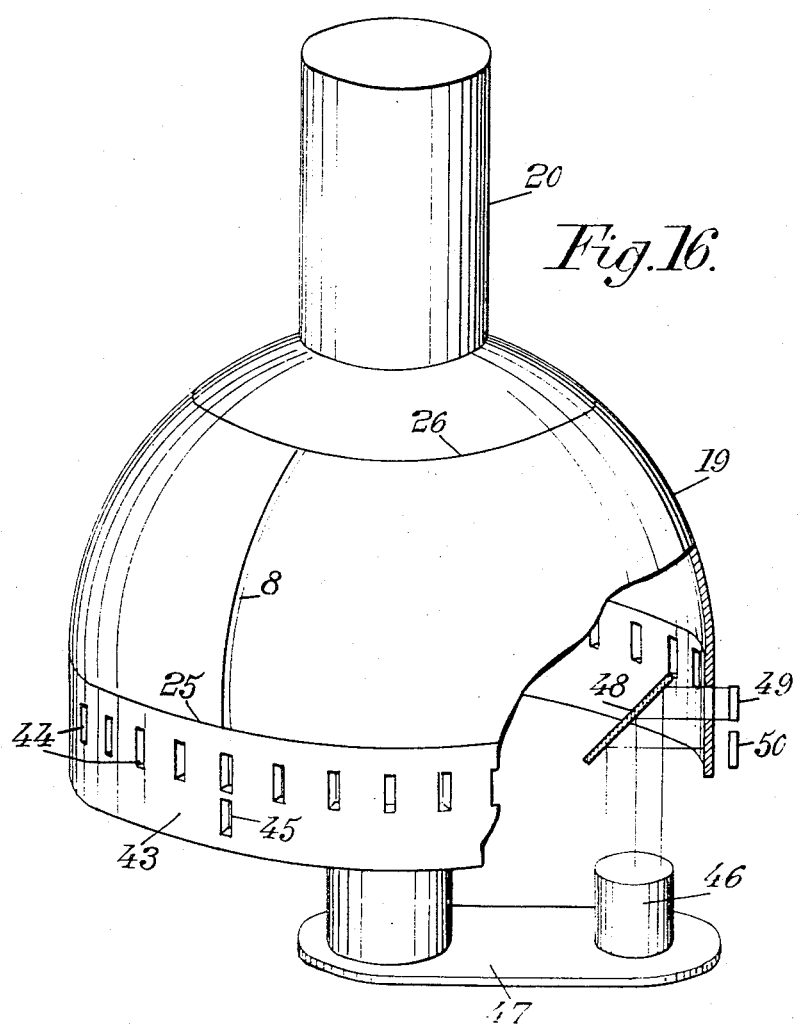

3,471,936
APPARATUS FOR MEASURING THE SPHERICAL COORDINATES OF A LUMINOUS POINT
Rene Jean-Baptiste Claret, Sceaux, France, assignor to Societe d'Applications Generales d'Electricite et de Mecanique S.A.G.E.M., Paris, France
Filed July 3, 1967, Ser. No. 650,868
Claims priority, application France, July 22, 1966, 70,540
Int. Cl. E21b 47/02
U.S. Cl. 33—205                                16 Claims

ABSTRACT OF THE DISCLOSURE

Apparatus for measuring the angular separation between the direction of a geological drilling line and the vertical. The apparatus is mounted inside one of the tubular sections of the drilling line, relatively near the bit. The apparatus comprises an optical device, a plane reflecting surface pivotable about a pivot point, reflecting means interposed between the optical device and the reflecting surface, a modulation device, an analysis device and an optical separator device.

---

This invention relates to measuring apparatuses of the type which permit at least certain of the spherical coordinates of a luminous point to be measured, this point moving on a sphere or a spherical zone, the position of the luminous point being representative of a variable phenomenon to be studied. The invention relates more particularly, but not exclusively, to apparatuses in which the position of the luminous point is representative of the angular separation existing between a definite direction and the vertical, because it is in this case that its application seems to have most interest.

The chief object of the present invention is to provide a practical apparatus in which the indications delivered by the apparatus can be easily exploited.

The apparatus according to the present invention comprises:

An optical device adapted to emit from a luminous source a luminous beam having a fixed axis.

First reflecting means in the form of a plane reflecting surface pivotable about a pivot point situated on said axis of the luminous beam, the orientation of said plane reflecting surface being a function of the variable phenomenon to be studied, Second reflecting means interposed between said optical device and said first reflecting means and adapted to direct the luminous beam obliquely on said plane reflecting surface along an axis of reflection passing through said pivot point of said plane reflecting surface, said second reflecting means being adapted to rotate about said axis of said luminous beam, Third reflecting means comprising two concentric members adapted to rotate about said axis of said luminous beam at speeds of rotation different from each other but in a constant ratio, said third reflecting means being adapted to offer to said luminous point, during times whose durations area function of the variations of said variable phenomenon to be studied, reflecting zones adapted to reflect said luminous beam on itself, And an optical separator device adapted to intercept a part of the luminous beam reflected on itself and to direct this intercepted part onto a sensitive device adapted to deliver an electric impulse when it receives said intercepted part.

In a preferred embodiment of the invention, the luminous point is representative of the angular separation existing between a definite direction and the vertical.

Other features of the invention will become apparent from the following specific description of preferred embodiments of the invention. These preferred embodiments are given merely by way of example, and will be described with reference to the accompanying drawings, in which FIGURE 1 shows schematically, in axial section, an apparatus according to the invention;

FIGURES 2 and 3 show, in perspective and on a larger scale, an important element of the apparatus shown in FIGURE 1, this element being formed according to a first solution;

FIGURES 4 to 8 illustrate the operation of the apparatus of FIGURE 1, and show the element of FIGURE 2 or of FIGURE 3;

FIGURES 12 and 13 show, by a perspective on a larger scale with certain parts cut away, an important element of the apparatus shown in FIGURE 11, this element being formed according to a first solution;

FIGURE 16 shows schematically in perspective a complementary feature of the invention.

Figure 1:
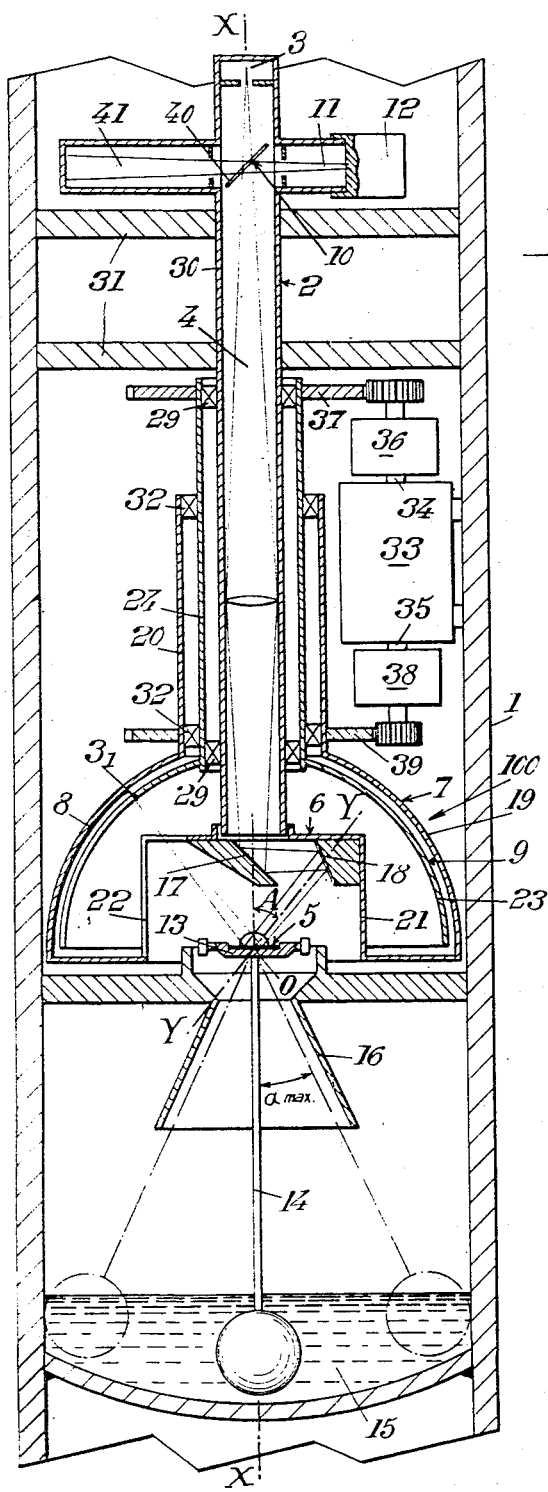

The specific embodiments shown in the drawings are adapted to measure at least certain of the spherical coordinates of a luminous point whose position is representative of the angular separation existing between a definite direction and the vertical. In particular, this apparatus is intended to be incorporated in a geological drilling line for determining the separation of the axis of this line from the vertical.

Such an apparatus should thus be situated relatively near the drilling head since it is in this region of the drilling line that it is most interesting to know the separation between the axis of the line and the vertical.

The apparatus is thus located at a depth of several hundreds of meters, and its operating conditions are very unfavourable and little compatible with the precision demanded of the apparatus.

Althouh the measurement is effected when the drilling line is stopped, the apparatus undergoes, during the periods of penetration of the drilling line, very large mechanical stresses (brutal angular accelerations, vibrations, shocks, etc. . . .).

Moreover, the possibility of checking the apparatus are extremely limited since its accessibility is only possible before the drilling line is put in place.

Figure 11:
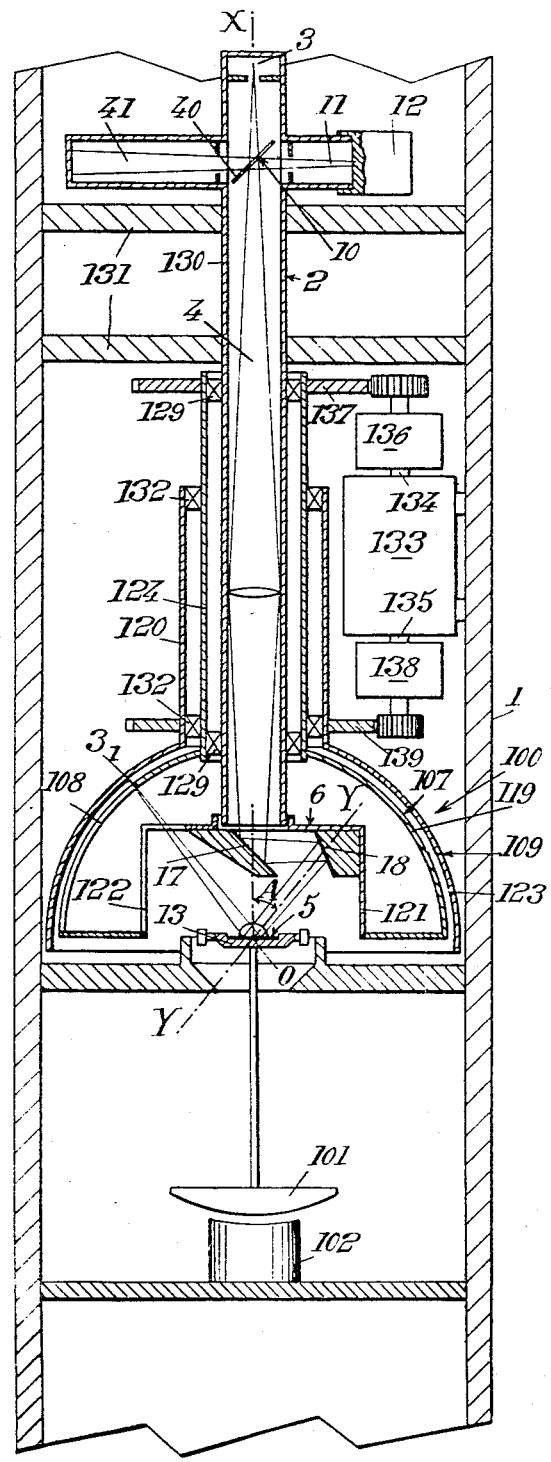
FIGURE 11 shows schematically, in axial section, an apparatus according to another embodiment of the invention.

As shown in FIGURES 1 and 11, the apparatus is mounted at the interior of a tubular section 1 comprising one of the sections of the drilling line and situated relatively near the drilling head (not shown).

According to the principal feature of the invention, the embodiments of FIGURES 1 and 11 both comprise:

An optical device 2 adapted to emit from a luminous source 3 a luminous beam 4 having a fixed axis XX parallel to and preferably coincident with the axis of the tubular section 1, First reflecting means 5 in the form of a plane reflecting surface is pivotable about a pivot point 0 situated on the axis XX of the luminous beam 4, this reflecting surface 5 being maintained perpendicular to the vertical, Second reflecting means 6 interposed between the optical device 2 and the plane reflecting surface 5 and adapted to direct the luminous beam 4 obliquely on said plane reflecting surface 5 along an axis of reflection YY passing through said pivot point 0 of said plane reflecting surface 5, said second reflecting means 6 being adapted to rotate about said axis XX of the luminous beam 4, Third reflecting means 100 comprising two concentric members adapted to rotate about said axis XX of the luminous beam 4 at speeds of rotation different from each other but in a constant ratio, this third reflecting means 100 being adapted to offer to said luminous point, during times whose durations are a function of the angular separation between the axis XX of the luminous beam 4 and the vertical, reflecting zones adapted to reflect the luminous beam 4 on itself.

And an optical separator device 10 adapted to intercept a part 11 of the luminous beam 4 reflected on itself and to direct this intercepted part 11 onto a sensitive device 12 adapted to deliver an electric impulse when it receives said intercepted part 11.

In the embodiments illustrated in FIGURES 1 and 11, the first reflecting means 5 comprises a plane mirror mounted on the cross bar of a universal joint type suspension 13 carrying a pendulum 14.

In the embodiment shown in FIGURE 1, the lower end of this pendulum 14 is preferably damped by a liquid 15 contained in the bottom of the apparatus, a retaining screen 16 of trunconical shape being advantageously provided around the upper end of the pendulum 14.

In the embodiment of FIGURE 11, the lower end of the pendulum 14 is metallic and has a lower face formed by a portion 101 of a sphere centered at the pivot point 0 of the reflecting surface 5, this spherical portion 101 moving in front of a device having at least one fixed permanent magnet 102, preferably coaxial with the axis XX of the luminous beam 4.

In another embodiment (not shown) of the invention, the plane reflecting surface is formed by the free surface of some mercury contained in a spherical container whose upper hemisphere at least is transparent. The free surface reaches the diametrical plane of the spherical container, which diametrical plane is perpendicular to the vertical, so that the pivot point of this reflecting surface is located at the intersection of this diametrical plane and the axis of the optical device.

The damping is then obtained by a thin layer of a transparent viscous liquid (for example a silicone liquid) lying on the free surface of the mercury.

It will be noted that the apparatus according to this embodiment permits it to be assured that the end of the drilling line is completely stopped when one wishes to take a measurement of the vertical, since the reflection on such a surface is only effected correctly if the free surface of the mercury is perfectly tranquil, hence only if the drilling line is completely stopped.

With respect to the second reflecting means 6, it can advantageously be formed, as shown in FIGURES 1 and 11, by two plane mirrors perpendicular to the plane defined by the axis XX of the luminous beam 4 and the axis of reflection YY of the second reflecting means 6, namely, A first mirror 17 inclined at 45° with respect to the axis XX and which reflects the luminous beam 4 in a direction perpendicular to the axis XX, And a second mirror 18 which reflects the luminous beam reflected horizontally by the first mirror 17 onto the reflecting surface 5 along an angle of incidence A of about 40° when the reflecting surface 5 is horizontal.

The first embodiment of the invention shown in FIGURE 1 will now be considered. In this embodiment, the two concentric members of the third reflecting means 100 respectively comprise, A modulation device 7 whose active element is formed by a fraction of a reflecting meridian 8 which belongs to a sphere centered at the pivot point 0 of the reflecting surface 5 and of radius such that the image $3_1$ of the luminous source 3 is formed on its interior face, and which is situated in the plane defined by the axis XX and the axis YY, this fraction of a reflecting meridian 8 being provided with reflecting properties on its concave face, said modulation device 7 turning in synchronism with the second reflecting means 6 about the axis XX, And an analysis device 9 comprising an obturator turning about the axis XX at a speed of rotation lower than, and in constant ratio with, the speed of rotation of the assembly of the second reflecting means 6 and the modulation device 7, this turning obturator being interposed between the modulation device 7 and the plane reflecting surface 5 and having at least two active lines 27 and 28 delimiting an opaque zone $Z_0$ and a transparent zone $Z_T$.

As for the modulation device 7, it is advantageously formed by a hemispherical portion 19 whose corresponding sphere is centered at the pivot point 0, this hemispherical portion 19 being disposed with its convex surface directed towards the top of the apparatus. The hemispherical portion 19 is provided, At its top, with a tubular extension 20 co-axial with the axis XX, and which will be more explicitly described later, And at its lower part, with a support 21 on which the second reflecting means 6 is fixed, the support 21 being provided with an opening 22 through which an optical beam can pass between the reflecting surface 5 and the reflecting meridian 8.

Concerning this reflecting meridian 8, it is appropriate to point out that it can be formed by first of all polishing the entire concave face of the hemispherical portion 19, then by masking this concave face, except for a thin band constituting precisely the reflecting meridian 8; this masking can be obtained by coating the above mentioned concave face with a black mat coating.

As for the obturator forming the analysis device 9, it can advantageously comprise a hemispherical portion 23, whose corresponding sphere is centered at the pivot point 0, this hemispherical portion 23 being disposed with its convex surface directed towards the top of the apparatus. The hemispherical portion 23 is situated inside the hemispherical portion 19 forming the modulation device 7, preferably, as near as possible (taking into account the mechanical tolerances) to the hemispherical portion 19.

The hemispherical portion 23 is then provided, at its top, with a tubular extension 24 extending co-axial with the axis XX inside the tubular extension 20 of the hemispherical portion 19 forming the modulation device 7, the role of this tubular extension 24 being more explicitly described later on.

The two active lines of such an obturator will now be described in more detail.

In FIGURES 2, 3, 9 and 10, the hemispherical portion 23 has been shown in a schematic perspective view. The useful part of the hemispherical portion 23 is delimited by two extreme parallels, namely, A lower extreme parallel 25 formed by the lower edge of the hemispherical portion 23, And an upper extreme parallel 26 whose position depends on the extent of the reflecting meridian 8, this upper extreme parallel 26 being formed by the section of the hemispherical portion 23 through the plane perpendicular to the axis XX and passing through the upper end of the reflecting meridian 8.

In FIGURES 2, 3, 9 and 10, the hemispherical portion for example the first active line designated by the reference numeral 27, can advantageously be formed by a meridian arc comprised between the lower extreme parallel 25 and the upper extreme parallel 26, the equation of this first active line thus being, $\theta$ designating the longitude and $\varphi$ the latitude, $$\theta = \theta_0 = \text{constant}$$

the values of $\varphi$ being limited by $\varphi = 0$ (the value of $\varphi$ corresponding to the lower parallel 25) and by $\varphi = \varphi_0$ (the value of $\varphi$ corresponding to the upper parallel 26).

The other active line, designated by the reference numeral 28, is then advantageously formed by a line of equation $$\theta = F(\varphi)$$

in which $\theta$ designates the longitude, $\varphi$ the latitude, and F is any function.

In particular, F can be a linear function.

According to the solution illustrated in FIGURE 2, the equation of the active line 28 is:

$$\theta = \theta_0 - k(\varphi - \varphi_0)$$

in which $k$ designates a constant whose value can advantageously be equal to $2\pi/\varphi_0$.

In these conditions, the upper end of the second active line 28 is at the intersection of the upper extreme parallel 26 and the first active line 27, whereas the lower end of the second active line 28 is at the intersection of the lower extreme parallel 25 and the first active line 27.

According to the solution illustrated in FIGURE 3, and for reasons which will appear more clearly from the following, the equation of the second active line 28 is preferably:

$$\theta = \theta_{10} - \frac{2\pi}{\varphi_0}(\varphi - \varphi_0)$$

in which $\theta_{10}$ has a value slightly different from $\theta_0$.

In FIGURES 2 and 3, the opaque zone $Z_0$ of the analysis device 9 is formed by the part of the hemispherical portion 23 situated above the second active line 28, the transparent zone $Z_T$ of the analysis device 9 then being obtained by removing the material below the second active line 28.

It is appropriate, at this point of the description, to explain briefly the operation of the apparatus comprising such an analysing device 9.

When the axis XX coincides exactly with the vertical, the reflecting surface 5 is horizontal and the image $3_1$ of the luminous source 3 is located on the hemispherical portion 19 at the level of the upper extreme parallel 26 of latitude:

$$\varphi_0 = \frac{\pi}{2} - A \quad \text{(FIGURES 1, 2, 3)}$$

A designating the acute angle formed by the axes XX and YY.

Whatever the angular position of the hemispherical portion 19 is, the image $3_1$ falls on the reflecting meridian 8 which reflects the luminous beam 4 if this beam is not obturated by the presence of the abturator formed by the opaque zone of the hemispherical portion 23.

If it is now supposed that the axis XX makes an angle $\alpha$ with the vertical, the reflecting surface 5 is inclined by an angle $\alpha$ with respect to the horizontal and the image $3_1$ of the luminous source 3 is located on a parallel 42 (FIGURES 4, 5, 6, 7 and 8) of latitude $\varphi = \varphi_0 - 2\alpha$.

Contrary to what happened in the previous case, the image $3_1$ only falls on the reflecting meridian 8 once per resolution of the hemispherical portion 19, and this takes place when the reflecting meridian 8 is situated in a plane perpendicular to the plane of the reflecting surface 5. Thus the influence of the angle of azimuth in which the axis of the drilling line (axis XX) is located is eliminated. Thus, at each revolution of the hemispherical portion 19, the reflecting meridian 8 passes the level of the image $3_1$ and reflects the luminous beam 4 if this beam is not obturated by the presence of the obturator formed by the opaque zone of the hemispherical portion 23.

When the luminous beam 4 is not obturated, it is reflected and the sensitive member 12 delivers an electric impulse. This will happen at each revolution of the hemispherical portion 19 (FIGURES 4 and 5).

Suppose then, by way of example, that the hemispherical portions 19 and 23 turn in the same direction, this direction being indicated by the arrow F in FIGURES 4, 5, 6, 7 and 8, and that the speeds of rotation of these two hemispherical portions 19 and 23 are in the ratio R.

After a certain number of revolutions, $n$ revolutions for the hemispherical portion 19 and $n/R$ revolutions for the hemispherical portion 23, the first line 27 will arrive at the level of the image $3_1$ and since the luminous beam 4 is obturated, this beam will no longer be reflected and the sensitive member 12 will not deliver an electric impulse 6 (FIGURE 6).

This situation, with the luminous beam 4 obturated, will last until the second active line 28 arrives at the level of the image $3_1$, the hemispherical portion 19 having then effected $(p-1)$ revolutions and the hemispherical portion 23 $(p-1)/R$ revolutions (FIGURE 7).

On the following revolution, $p$ for the hemispherical portion 19 and $p/R$ for the hemispherical portion 23, the second active line 28 passes the image $3_1$, and since the luminous beam 4 is no longer obturated, this beam 4 will be reflected and the sensitive member 12 will again deliver an electric impulse (FIGURE 8).

This situation, with the luminous beam 4 not obturated, will last until the first active line 27 arrives at the level of the image $3_1$ (FIGURE 6).

At that time, the hemispherical portion 23 will have effected one complete revolution.

It can be seen that the measurement of the latitude $\varphi = \varphi_0 - 2\alpha$ of the image $3_1$ will consist in counting, for each complete revolution of the hemispherical portion 23, the number of electric impulses delivered by the sensitive member 12, by reason of one electric impulse per passage of the reflecting meridian 8 across the image $3_1$, that is, one electric impulse per revolution of the hemispherical portion 19.

When the axis XX coincides exactly with the vertical the latitude of the image $3_1$ is equal to $\varphi_0$, and a minimum number of electric impulses will be obtained, since, as has been mentioned previously, the equation of the second active line 28 is in the form (FIGURE 3), $$\theta = \theta_{10} - \frac{2\pi}{\varphi_0}(\varphi - \varphi_0)$$

According to the value of the difference $\theta_{10} - \theta_0$ an electric impulse (or several electric impulses) will be obtained. If this difference $\theta_{10} - \theta_0$ were null (FIGURE 2) no electric impulse would be obtained, which would be inconvenient for one would not known if this absence of an electric impulse is due to the fact that the axis XX is really coincident with the vertical or to the fact that the apparatus is not working.

When the axis XX makes an angle $\alpha_{max}$ with the vertical, which represents (FIGURE 1) the maximum separation that the apparatus is capable of measuring, the latitude of the image $3_1$ is equal to 0 and a maximum number of electric impulses will be obtained, this maximum number being equal to the ratio R of the speeds of rotation of the hemispherical portions 19 and 23.

It will be noted that, in this case, the emission of electric impulses will be continuous, which causes certain disadvantages for the counting of these impulses. It will thus be advantageous to adopt a ratio $R_1$ of the speeds of rotation of the hemispherical portions 19 and 23 slightly different from the calculated ratio R, so that at least one silence between two revolutions of the hemispherical portion 23 will be obtained.

By way of example, if it is desired to measure a maximum separation of $\alpha_{max} = 25°$ with a precision of $0.25°$, the equation of the active line 28 will then be:

$$\theta = \theta_{10} - 7.2(\varphi - 50)$$

since $$\varphi_0 = \frac{\pi}{2} - A = 2\alpha_{max} = 50°$$

As for the difference $\theta_{10} - \theta_0$, it will be equal to $1.8°$ in order to respect the required precision of $0.25°$, the calculated ratio R between the speeds of rotation of the hemispherical portions 19 and 23 being equal to 100, whereas a ratio $R_1$ eqaul to 102 or 103 can be adopted to obtain at least one silence in the counting scale corresponding to $\alpha_{max.}=25°$.

With the apparatus which has been described up till now,

When the axis XX coincides exactly with the vertical, a minimum number of electric impulses will be obtained, the value of this minimum number depending on the difference $\theta_{10}-\theta_0$, And when the axis XX makes an angle $\alpha_{max.}$ with the vertical, a maximum number of electric impulses will be obtained, these electric impulses being separated by at least one silence between each revolution of the hemispherical portion 23, the value of this silence depending on the ratio $R_1$ of the speeds of rotation of the hemispherical portions 19 and 23.

It would be preferable, in particular for obtaining a precise measurement, to arrange the apparatus so that, When the axis XX coincides with the vertical, a maximum number of electric impulses are obtained, separated by at least one silence between each revolution of the hemispherical portion 23, this silence being explained more explicitly later on, And when the axis XX makes an angle $\alpha_{max.}$ with the vertical, a minimum number of electric impulses will be obtained.

Figure 9:
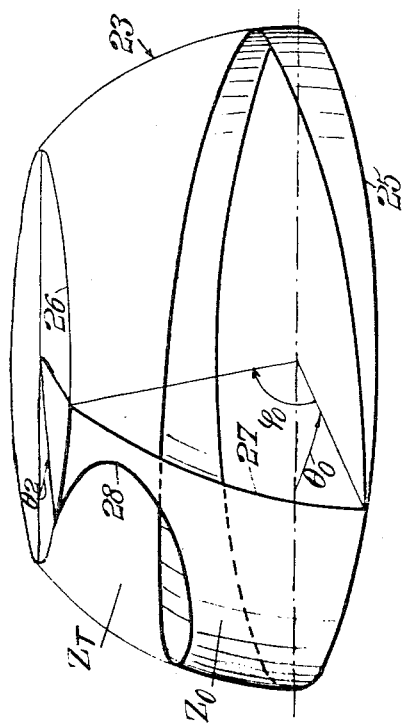

To this end, the solution illustrated in FIGURE 9 can be adopted. In this solution, the equation of the active line 28 is:

$$\theta = \frac{\theta_0}{h\varphi+1}$$

in which $h$ designates a constant equal to $$\frac{\theta_0-\theta_2}{\varphi_0\theta_2}$$

the value of $\theta_2$ in this fraction depending,

On the one hand, on the duration during which the luminous beam 4 can be reflected by the reflecting meridian 8, And on the other hand, on the duration of the silence during which it is desired that the sensitive member 12 does not deliver any electric impulse when the reflecting surface 5 is horizontal.

In FIGURE 9, the opaque zone $Z_0$ of the analysis device 9 is constituted by the part of the hemispherical portion 23 situated below the second active line 28, the transparent zone $Z_T$ of the analysis device 9 being obtained by removing the material above the second active line 28.

Figure 10:
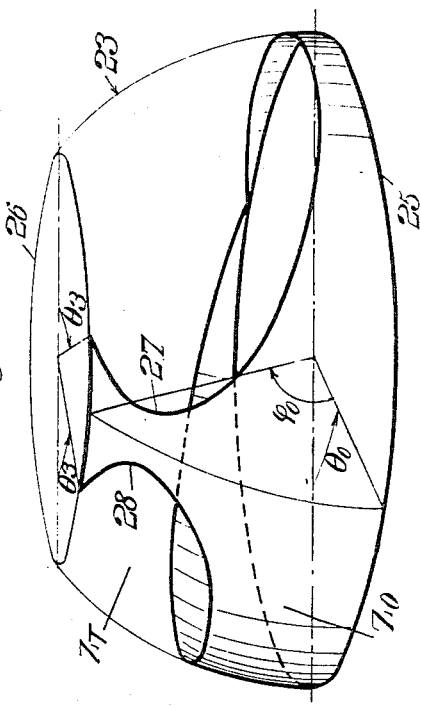
FIGURES 9 and 10 show, in perspective and on a larger scale, the same element as that shown in FIGURES 2 and 3, but formed according to another solution.

Alternatively, in order to obtain the characteristics of the cut off of the luminous beam 4 identical by the first active line 27 and by the second active line 28, the solution illustrated in FIGURE 10 can be adopted.

In this solution, the first active line 27 and the second active line 28 of the analysis device 9 are disposed symmetrically with respect to each other about a meridian arc of longitude $\theta=\theta_0$ comprised between the lower extreme parallel 25 and the upper extreme parallel 26, The equation of the first active line 27 being in the form:

$$\theta=\frac{\theta_o}{m\varphi+1}$$

and the equation of the second active line 28 being in the form:

$$\theta=-\frac{\theta_o}{m\varphi+1}$$

in which $m$ designates a constant equal to $$\frac{\theta_o-\theta_3}{\varphi_0\theta_3}$$

in which fraction the value of $\theta_3$ depends,

On the one hand, on the duration during which the luminous beam 4 can be reflected by the reflecting meridian 8, And on the other hand, by the duration of the silence during which it is desired that the sensitive member 12 should not deliver any electric impulse when the reflecting surface 5 is horizontal.

In FIGURE 10, the opaque zone $Z_0$ of the analysis device 9 is formed by the part of the hemispherical portion 23 situated below the first active line 27 and below the second active line 28, the transparent zone $Z_T$ of the analysis device being obtained by removing the material above the first active line 27 and above the second active line 28.

It is appropriate to note that the solutions shown in FIGURES 9 and 10 eliminate the inevitable material imperfections of the reflecting meridian 8 (whose width is not negligible) and of the image $3_1$ of the luminous source 3 (whose diameter is not negligible).

The operation of the apparatus comprising such an analysis device 9 is analogous to that explained previously.

So far, nothing has been said concerning the means for turning, on the one hand, the assembly of the second reflecting means 6 and the modulation device 7, and on the other hand, the analysis device 9.

To this end, the embodiment shown in FIGURE 1 can advantageously be used. In this embodiment, The tubular extension 24 of the hemispherical portion 23 is mounted, by the intermediary of bearings 29, on a tube 30 housing the optical device 2 and maintained coaxial with the tubular section 1 by straps 31, And the tubular extension 20 of the hemispherical portion 19 is mounted, by the intermediary of bearings 32, on the tubular extension 24 of the hemispherical portion 23.

An electric motor 33 is provided having two output shafts 34 and 35 driving,

One (the shaft 34), a speed reducer 36 meshing with a toothed wheel 37 angularly keyed to the tubular section 24 of the hemispherical portion 23, And the other (the shaft 35), a speed reducer 38 meshing with a toothed wheel 39 angularly keyed on the tubular section 20 of the hemispherical portion 19, These two reducers 36 and 38, as well as the two toothed wheels 37 and 39, being such that the speed of rotation of the analysis device 9 is less than the speed of rotation of the assembly of the second reflecting means 6 and the modulation device 7.

Due to this mounting, it is certain that the ratio between the speed of rotation of the analysis device 9 and the speed of rotation of the assembly of the second reflecting means 6 and the modulation device 7 remains constant.

Another embodiment of the invention will now be described. This embodiment is shown in FIGURE 11. In this embodiment, the two concentric members of the reflecting assembly 100 are respectively comprised by, An analysis device 109 formed by a sphere rotatable about the axis XX centered at the pivot point 0 of the reflecting surface 5, and of radius such that the image $3_1$ of the luminous source 3 is formed on its interior face, this interior face having at least two active lines 127 and 128 delimiting between themselves a reflecting zone $Z_R$ and an absorbent zone $Z_A$, And a modulation device 107 whose active element is formed by a meridian slit 108, which is formed in an obturator rotating in synchronism with the second reflecting means 6 about the axis XX at a speed of rotation greater than and in constant ratio with the speed of rotation of the analysis device 109, and which is situated in the plane defined by the axis XX and the axis YY, this rotating obturator being interposed between the analysis device 109 and the plane reflecting surface 5.

As for the analysis device 109, this is formed by a hemispherical portion 123 centered at the pivot point 0, and having its convex part direct towards the top of the apparatus, this hemispherical portion 123 being provided, at its top, with a tubular extension 120 co-axial with the axis XX and which will be explained in more detail later on.

Concerning the reflecting zone $Z_R$ and the absorbent zone $Z_A$, these can be formed by first of all polishing the entire concave face of the hemispherical portion 123, and then masking this concave face on the absorbent zone $Z_A$, this masking being obtained by coating the concave face with a black mat coating.

With regard to the obturator forming the modulation device 107, it can advantageously be comprised by a hemispherical portion 119, centered at the pivot point 0, with its convex part directed towards the top of the apparatus, and situated inside the hemispherical portion 123 forming the analysis device 109, preferably as near as possible (taking into account the mechanical tolerances) to the hemispherical portion 123.

The hemispherical portion 119 is then provided,

At its top, with a tubular extension 124 extending co-axial with the axis XX inside the tubular extension 120 of the hemispherical portion 123 forming the analysis device 109, the role of this tubular extension 124 being more explicitly described hereafter.

And at its lower part, with a support 121 on which the second reflecting means 6 is fixed, the said support 121 being provided with an opening 122 providing an optical path between the reflecting surface 5 and the meridian slit 108.

The two active lines of an analysis device 109 such as described above will now be more explicitly explained.

In FIGURES 12, 13, 14 and 15, the hemispherical portion 123 has been shown in a schematic perspective view, the useful part of this hemispherical portion 123 being delimited by two extreme parallels, namely, A lower extreme parallel 125 formed by the lower edge of the hemispherical portion 123, And an upper extreme parallel 126 whose position depends on the extent of the meridian slit 108, this upper extreme parallel 126 being formed by the section of the hemispherical portion 123 through the plane perpendicular to the axis XX and passing through the upper end of the meridian slit 108.

Figure 14:
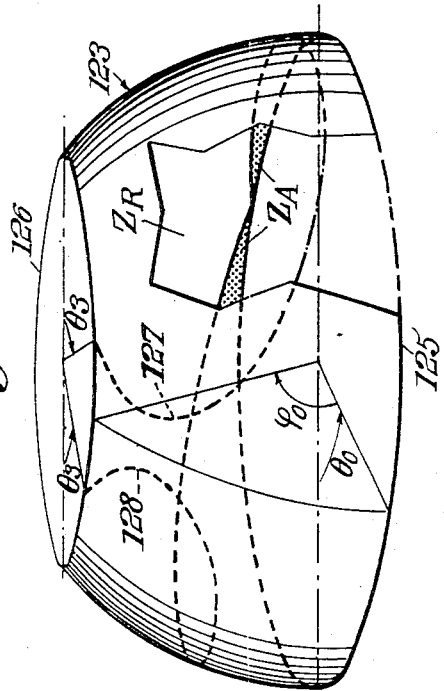
FIGURES 14 and 15 show, by a perspective on a larger scale with certain parts cut away, the same element as that shown in FIGURES 12 and 13, but formed according to another solution.

In FIGURES 12, 13 and 14, the first active line, designated by reference numeral 127, is formed by a meridian arc comprised between the lower extreme parallel 125 and the upper extreme parallel 126, the equation of this first active line thus being, $\theta$ designating the longitude and $\varphi$ the latitude, $$\theta = \theta_0 = \text{constant}$$

the values of $\varphi$ being limited by $\varphi = 0$ (the value of $\varphi$ corresponding to the lower parallel 125) and by $\varphi = \varphi_0$ (the value of $\varphi$ corresponding to the upper parallel 126).

The second active line, which is designated by the reference numeral 128, is then advantageously formed by a line of equation $$\theta = F(\varphi)$$

in which $\theta$ designates the longitude, $\varphi$ the latiude and F any function.

In particular, F can be a linear function.

According to the solution illustrated in FIGURE 12, the equation of the active line 128 is:

$$\theta = \theta_0 - k(\varphi - \varphi_0)$$

in which $k$ designates a constant whose value can advantageously be equal to $2\pi/\varphi_0$.

In these conditions, the upper end of the second active line 128 is at the intersection of the upper extreme parallel 126 and the first active line 127, whereas the lower end of the second active line 128 is at the intersection of the lower extreme parallel 125 and the first active line 127.

According to the solution illustrated in FIGURE 13, for reasons which will become apparent from the following, the equation of the second active line 128 is preferably:

$$\theta = \theta_{10} - \frac{2\pi}{\varphi_0}(\varphi - \varphi_0)$$

in which $\theta_{10}$ has a value slightly different from $\theta_0$.

In FIGURES 12 and 13, the absorbent zone $Z_A$ of the analysis device 109 is formed by the part of the hemispherical portion 123 situated above the second active line 128, the reflecting zone $Z_R$ of the analysis device 109 being formed by the part of the hemispherical portion 123 situated below the second active line 128.

The operation of the apparatus provided with such an analysis device 109 is analogous to that explained previously with respect to the apparatus having the analysis device 9 illustrated in FIGURES 2 and 3.

As was the case with FIGURES 2 and 3, it can be mentioned, by way of example, that if it is desired to measure a maximum separation of $\alpha_{max.} = 25°$ with a precision of 0.25°, the equation of the active line 128 will then be:

$$\theta = \theta_{10} - 7.2(\varphi - 50)$$

since $\varphi_0 = 2\alpha_{max.} = 50°$.

As for the difference $\theta_{10} - \theta_0$, this can be equal to 1.8° in order to respect the precision of 0.25°, the calculated ratio R between the speeds of rotation of the hemispherical portions 123 and 119 being equal to 100, whereas a ratio $R_1$ equal to 98 or 97 can be adopted to obtain at least one silence in the counting scale corresponding to $\alpha_{max.} = 25°$.

In the apparatus which has just been described,

When the axis XX coincides exactly with the vertical, a minimum number of electric impulses will be obtained, the value of this minimum number depending on the difference $\theta_{10} - \theta_0$, And when the axis XX makes the angle $\alpha_{max.}$ with the vertical, a maximum number of electric impulses is obtained separated by at least one silence between each revolution of the hemispherical portion 119, the value of this silence depending on the ratio $R_1$ of the speeds of rotation of the hemispherical portions 123 and 119.

It can be more advantageous, particularly for precise measurements, to arrange the apparatus so that, When the axis XX coincides with the vertical, a maximum number of electric impulses is obtained, separated by at least one silence between each revolution of the hemispherical portion 119, this silence being explained in more detail later on, And when the axis XX makes the angle $\alpha_{max.}$ with the vertical, a minimum number of electric impulses is obtained.

To this effect, the solution of FIGURE 14 can be used, in which the equation of the active line 128 is:

$$\theta = \frac{\theta_0}{h\varphi + 1}$$

in which $h$ designates a constant equal to $$\frac{\theta_0 - \theta_2}{\varphi_0 \theta_2}$$

in which fraction the value of $\theta_2$ depends,

On the one hand, on the duration during which the luminous beam 4 can be reflected through the meridian slit 108, by the reflecting zone $Z_R$ of the analysis device 109, And on the other hand, on the duration of the silence during which it is desired that the sensitive member 12 should not deliver any electric impulse when the reflecting surface 5 is horizontal.

In FIGURE 14, the absorbent zone $Z_A$ of the analysis device 109 is formed by the part of the hemispherical portion 123, situated below the second active line 128, the reflecting zone $Z_R$ of the analysis device 109 being formed by the part of the hemispherical portion 123 situated above the second active line 128.

Figure 15:
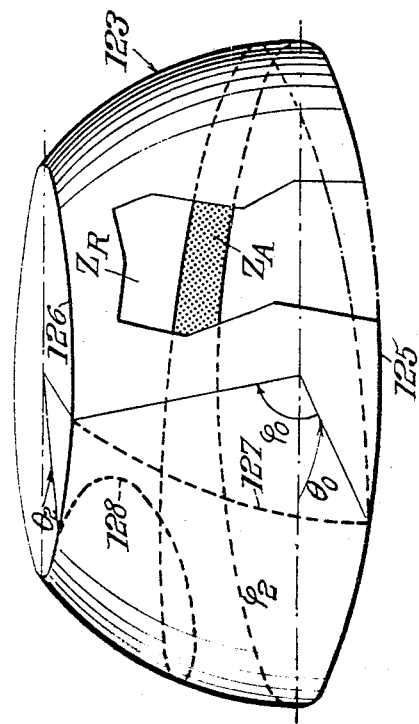

Alternatively, in order to obtain characteristics of the beginning and the end of the reflection of the luminous beam 4 identical by the first active line 127 and by the second active line 128, the solution illustrated in FIGURE 15 can be used.

According to this solution, the first active line 127 and the second active line 128 of the analysis device 109 are disposed symmetrically with respect to each other about a meridian arc of longitude $\theta=\theta_0$, comprised between the lower extreme parallel 125 and the upper extreme parallel 126, The equation of the first active line 127 being in the form:

$$\theta = \frac{\theta_0}{m\varphi+1}$$

and the equation of the second active line 128 being in the form:

$$\theta = -\frac{\theta_0}{m\varphi+1}$$

in which $m$ designates a constant equal to $$\frac{\theta_0 - \theta_3}{\varphi_0 \theta_3}$$

in which fraction the value of $\theta_3$ depends,

On the one hand, on the duration during which the luminous beam 4 can be reflected across the meridian slit 108 by the reflecting zone $Z_R$ of the analysis device 109, And, on the other hand, on the duration of the silence during which it is desired that the sensitive member 12 should not deliver any electric impulse when the reflecting surface 5 is horizontal.

In FIGURE 15, the absorbent zone $Z_A$ of the analysis device 109 is formed by the part of the hemispherical portion 123 situated below the first active line 127 and below the second active line 128, the reflecting zone $Z_R$ of the analysis device 109 being formed by the part of the hemispherical portion 123 situated above the first active line 127 and above the second active line 128.

The solutions illustrated in FIGURES 14 and 15 eliminate the inevitable material imperfections of the meridian slit 108 (whose width is not negligible) and of the image $3_1$ of the luminous source 3 (whose diameter is not negligible).

The operation of the apparatus comprising such an analysis device 109 is analogous to that explained previously.

So far, nothing has been said concerning the means for rotating, on the one hand, the assembly of the second reflecting means 6 and the modulation device 107, and on the other hand, the analysis device 109.

For this purpose, the embodiment shown in FIGURE 11 can be used, in which,

The tubular extension 124 of the hemispherical portion 119 is mounted, by the intermediary of bearings 129, on a tube 130 housing the optical device 2 and maintained co-axial to the tubular section 1 by straps 131, And the tubular extension 120 of the hemispherical portion 123 is mounted, by the intermediary of bearings 132, on the tubular extension 124 of the hemispherical portion 119.

An electric motor 133 is provided comprising two output shafts 134 and 135 driving, One (the shaft 134), a speed reducer 136 meshing with a toothed wheel 137 angularly keyed on the tubular section 124 of the hemispherical portion 119, And the other (the shaft 135), a speed reducer 138 meshing with a toothed wheel 139 angularly keyed on the tubular section 120 of the hemispherical portion 123, These two reducers 136 and 138, as well as the two toothed wheels 137 and 139, being such that the speed of rotation of the assembly of the second reflecting means 6 and the modulation device 107 is greater than the speed of rotation of the analysis device 109.

This mounting provides a constant ratio between the speed of rotation of the analysis device 109 and the speed of rotation of the assembly of the second reflecting means 6 and the modulation device 107.

Dealing now with the optical separator device 10, this device is comprised principally, as shown in FIGURES 1 and 11, By a semi-transparent reflector 40 inclined at 45° with respect to the axis XX and directing the intercepted part 11 of the reflected luminous beam onto the sensitive member 12 which can be formed, for example, by a photoelectric cell or a photomultiplier, And by a light trap 41 disposed perpendicular to the luminous beam 4, this light trap 41 being symmetrical with respect to the sensitive member 12.

With an apparatus constructed as has been described, the angular separation $\alpha$ existing between the vertical and the axis XX can be measured.

If it is now desired to know the angle of azimuth in which the axis of the drilling line is located (axis XX), it is then necessary to provide means for measuring the angle formed by a vertical reference plane with the vertical plane containing the reflecting meridian 8 (embodiment of FIGURES 1 to 10) or with the vertical plane containing the meridian slit 108 (embodiment of FIGURES 11 to 15).

These means can advantageously be formed by an impulse device delivering a number of impulses representative of the above mentioned angle.

Such a device is shown in FIGURE 16, which will be described in relation to the embodiment of FIGURES 1 to 10.

According to this feature, the hemispherical portion 19 is provided with a cylindrical skirt 43 on which is engraved, on the one hand, an equatorial graduation 44 defining, with the desired precision, the angles of longitude, and on the other hand, an index 45 situated in line with the reflecting meridian 8, this graduation 44 and this index 45 being outside the field obturable by the hemispherical portion 23.

This graduation 44 and index 45 can be formed by transparent zones traced on an opaque zone.

An auxiliary source 46 is provided, this auxiliary source 46 being carried by a support 47 rigid with the tubular section 1 and illuminating, by the intermediary of a mirror 48, disposed inside the skirt 43, the graduation 44 and the index 45 at the same time.

Outside the skirt 43, there are provided:

A first photoelectric cell 49 situated at the level of the graduation 44,

And a second photoelectric cell 50 situated at the level of the index 45,

These two cells 49 and 50 being radially aligned with respect to the mirror 48.

The first cell 49 provides for the counting of the graduations 44, whereas the second cell 50 assures the stopping of counting when the index 45 passes between the mirror 48 and the cell 50. The counting is started by the action of the signal of the measurement of the latitude, indicating the passage of the reflecting meridian 8 through the vertical meridian plane projecting the axis XX on the horizon, so that the azimuth of this plane is thus known.

It should be mentioned that the support 47, which in the example just described is rigid with the tubular section 1, could be carried, according to a modification of the invention which is not shown, by some mobile equipment whose orientation would be controlled by a detector of magnetic field.

Needless to say, an analogous device could be described with reference to the embodiment of FIGURES 11 to 15.

The embodiments of the invention described above provide an apparatus for measuring the separation between the axis of a drilling line and the vertical, which apparatus has a certain number of advantages of which the principal ones can be summarized by the following points:

The apparatus does not comprise any rotating electric contact,

The apparatus is comprised of elements which are not particularly sensitive to shocks or to mechanical vibrations, The apparatus provides reliable information and only requires a single preliminary calibration, The apparatus delivers signals directly coded without having to pass through a coder.

Although the invention has been described with reference to specific embodiments for measuring the angular separation between a definite direction and the vertical, this is not the only application of the invention. The invention could also be used, for example, for measuring the angular separation existing between a given direction and the direction of a magnetic or electric field. In this case, the apparatus would be practically identical to that which has been described, but the pendulum sensitive to gravity would be replaced by a pendulum sensitive to the action of an electric field.

What I claim is:

1. Apparatus for measuring the spherical coordinates of a luminous point representative of a variable angular separation between a determined direction and the vertical, the said luminous point moving on a spherical zone when said angular separation varies, said apparatus comprising:

an optical device adapted to emit from a luminous source a luminous beam having a fixed axis;

first reflecting means in the form of a plan reflecting surface pivotably mounted about a pivot point situated on said axis of the luminous beam, the orientation of said plane reflecting surface being a function of said variable angular separation;

second reflecting means interposed between said optical device and said first reflecting means and adapated to direct the luminous beam obliquely on said plane reflecting surface along an axis of reflection passing through said pivot point of said plane reflecting surface, said second reflecting means being adapted to rotate about said axis of said luminous beam;

a modulation device having an active element formed by a reflecting fraction of a meridian disposed in the plane defined by said axis of said luminous beam and said axis of reflection of said second reflecting means, said meridian belonging to an imaginary sphere centered at said pivot point of said plane reflecting surface and of radius such that the image of said luminous source is formed at the interior, concave face of said reflecting fraction of a meridian, which interior, concave face has reflecting properties, said modulation device rotating in synchronism with said second reflecting means around said axis of said luminous beam;

an analysis device comprising an obturator rotating about said axis of said luminous beam at a speed of rotation less than, and in constant ratio with, the the common speed of rotation of said second reflecting means and said modulation device, the said obturator being interposed between said modulation device and said plane reflecting surface, and having at least two active lines delimiting an opaque zone and a transparent zone;

driving means for rotating said modulation and analysis devices about said axis of said luminous beam, and for rotating said second reflecting means about said axis of said luminous beam;

said modulation and analysis devices being adapted to offer to said luminous point, during times whose durations are a function of the variations of said variable angular separation, reflecting zones adapted to reflect said luminous beam on itself;

and an optical separator device adapted to intercept a part of the luminous beam reflected on itself and to direct this intercepted part onto a device responsive to said intercepted part and adapted to deliver an electric impulse when it receives said intercepted part.

2. Apparatus according to claim 1, in which said modulation device comprises a hemispherical portion centered at said pivot point of said plane reflecting surface, said hemispherical portion being disposed with its convex surface directed towards the top of the apparatus.

3. Apparatus according to claim 2 in which said analysis device comprises a hemispherical portion centered at said pivot point of said plane reflecting surface, said hemspherical portion forming said analysis device being disposed with its convex surface directed towards the top of the apparatus and being situated inside and as near as possible to said hemispherical portion forming the modulation device.

4. Apparatus according to claim 3 in which said first active line of the analysis device is constituted by a meridian arc comprised between a lower extreme parallel of latitude $\varphi=0$ and an upper extreme parallel of latitude $\varphi=\varphi_0$, the equation of this line being $\theta=\theta_0=$ a constant where $\theta$ represents the longitude, and said second active line of said analysis device comprises a line of equation $\theta=F(\varphi)$.

5. Apparatus according to claim 4 in which the equation of said second active line is of the form $\theta=\theta_0-k$ $(\varphi-\varphi_0)$, where $k$ represents a constant equal to $2\pi/\varphi_0$.

6. Apparatus according to claim 4 in which the equation of said second active line is of the form $\theta=\theta_{10}-k$ $(\varphi-\varphi_0)$ where $k$ represents a constant equal to $2\pi/\varphi_0$ and where $\theta_{10}$ has a value slightly different from the value $\theta_0$.

7. Apparatus according to claim 4 in which the equation of said second active line is in the form $$\theta=\frac{\theta_0}{h\varphi+1}$$

where $h$ represents a constant equal to $$\frac{\theta_0-\theta_0}{\varphi_0\theta_2}$$

in which constant $\theta_2$ is a particular value of $\theta$.

8. Apparatus according to claim 3 in which said first active line and said second active line of said analysis device are disposed symmetrically with respect to each other about a meridian arc of longitude $\theta=\theta_0$ comprised between a lower extreme parallel of latitude $\varphi=0$ and an upper extreme parallel of latitude $\varphi=\varphi_0$, the equation of said first active line being of the form $$\theta=\frac{\theta_0}{m\varphi+1}$$

and the equation of the second active line being of the form $$\theta=-\frac{\theta_0}{m\varphi+1}$$

where $m$ represents a constant equal to $$\frac{\theta_0-\theta_3}{\varphi_0\theta_3}$$

in which constant $\theta_3$ is a particular value of $\theta$.

9. Apparatus for measuring the spherical coordinates of a luminous point representative of a variable angular separation between a determined direction and the vertical, the said luminous point moving on a spherical zone when said angular separation varies, said apparatus comprising:

an optical device adapted to emit from a luminous source a luminous beam having a fixed axis;

first reflecting means in the form of a plane reflecting surface pivotably mounted about a pivot point situated on said axis of the luminous beam, the orientation of said plane reflecting surface being a function of said variable angular separation;

second reflecting means interposed between said optical device and said first reflecting means and adapted to direct the luminous beam obliquely on said plane reflecting surface along an axis of reflection passing through said pivot point of said plane reflecting surface, said second reflecting means being adapted to rotate about said axis of said luminous beam;

an analysis device comprising a spherical portion adapted to rotate about said axis of said luminous beam, said spherical portion being centered at said pivot point of said plane reflecting surface and being of radius such that the image of said source is formed at its interior face, said interior face having at least two active lines delimiting a reflecting zone and an absorbing zone;

a modulation device comprising an obturator having an active element in the form of a meridian slit, said obturator being interposed between said analysis device and said plane reflecting surface and rotating in synchronism with said second reflecting means about said axis of said luminous beam at a speed of rotation greater than, and in constant ratio with, the speed of rotation of said analysis device, said meridian slit being situated in the plane defined by the axis of the luminous beam and the axis of reflection of said second reflecting means;

driving means for rotating said analysis and modulation devices about said axis of said luminous beam, and for rotating said second reflecting means about said axis of said luminous beam;

said analysis and modulation devices being adapted to offer to said luminous point, during times whose durations are a function of the variations of said variable angular separation, reflecting zones adapted to reflect said luminous beam on itself;

and an optical separator device adapted to intercept a part of the luminous beam reflected on itself and to direct this intercepted part onto a device responsive to said intercepted part and adapted to deliver an electric impulse when it receives said intercepted part.

10. Apparatus according to claim 9 in which said analysis device comprises a hemispherical portion centered at said pivot point of said plane reflecting surface, said hemispherical portion being disposed with its convex surface directed towards the top of the apparatus.

11. Apparatus according to claim 10 in which said modulation device comprises a hemispherical portion centered at said pivot point of said plane reflecting surface, said hemispherical portion of said modulation device being disposed with its convex surface directed towards the top of the apparatus, and being situated at the interior of, and as near as possible to, said hemispherical portion forming the analysis device.

12. Apparatus according to claim 11 in which said first active line of the analysis device is comprised by a meridian arc comprised between a lower extreme parallel of latitude $\varphi=0$ and an upper extreme parallel of latitude $\varphi=\varphi_0$, the equation of this line being $\theta=\theta_0=$ a constant, where $\theta$ represents the lingitude, and said second active line of this analysis device is comprised by a line of equation $\theta=F(\varphi)$.

13. Apparatus according to claim 12 in which the equation of said second active line is in the form $$\theta=\theta_0-k(\varphi-\varphi)$$

where $k$ represents a constant equal to $2\pi/\varphi_0$.

14. Apparatus according to claim 20 in which the equation of second active line is in the form $$\theta=\theta_{10}-k(\varphi-\varphi_0)$$

where $k$ represents a constant equal to $2\pi/\varphi_0$ and where $\theta_{10}$ has a value slightly different from the value of $\theta_0$.

15. Apparatus according to claim 12 in which the equation of said second active line is in the form $$\theta=\frac{\theta_0}{h\varphi+1}$$

where $h$ represents a constant equal to $$\frac{\theta_0-\theta_2}{\varphi_0\theta_2}$$

in which constant $\theta_2$ is a particular value of $\theta$.

16. Apparatus according to claim 11 in which said first active line and said second active line of the analysis device are disposed symmetrically with respect to each other about a meridian arc of longitude $\theta=\theta_0$ comprised between a lower extreme parallel of latitude $\varphi=0$ and an upper extreme parallel of latitude $\varphi=\varphi_0$, the equation of said first active line being in the form $$\theta=\frac{\theta_0}{m\varphi+1}$$

and the equation of the second active line being in the form $$\theta=-\frac{\theta_0}{m\varphi+1}$$

where $m$ represents a constant equal to $$\frac{\theta_0-\theta_3}{\varphi_0\theta_3}$$

in which constant $\theta_3$ is a particular value of $\theta$.

References Cited

UNITED STATES PATENTS

| | | | |
|---|---|---|---|
| 1,732,397 | 10/1929 | Braibant | 33—220 |
| 1,919,332 | 7/1933 | Jones. | |
| 2,208,147 | 7/1940 | Eisler | 33—205 |
| 2,365,999 | 12/1944 | Boucher | 33—205 |
| 2,413,399 | 12/1946 | Wood. | |
| 2,438,293 | 3/1948 | Livingston | 33—205 X |
| 2,621,808 | 12/1952 | Blakeney | 250—233 X |
| 2,685,082 | 7/1954 | Beman et al. | 250—233 X |
| 2,693,991 | 11/1954 | Holtz | 250—233 X |

RALPH G. NILSON, Primary Examiner

C. M. LEEDOM, Assistant Examiner

U.S. Cl. X.R.

250—220, 216, 233